Figure 1:
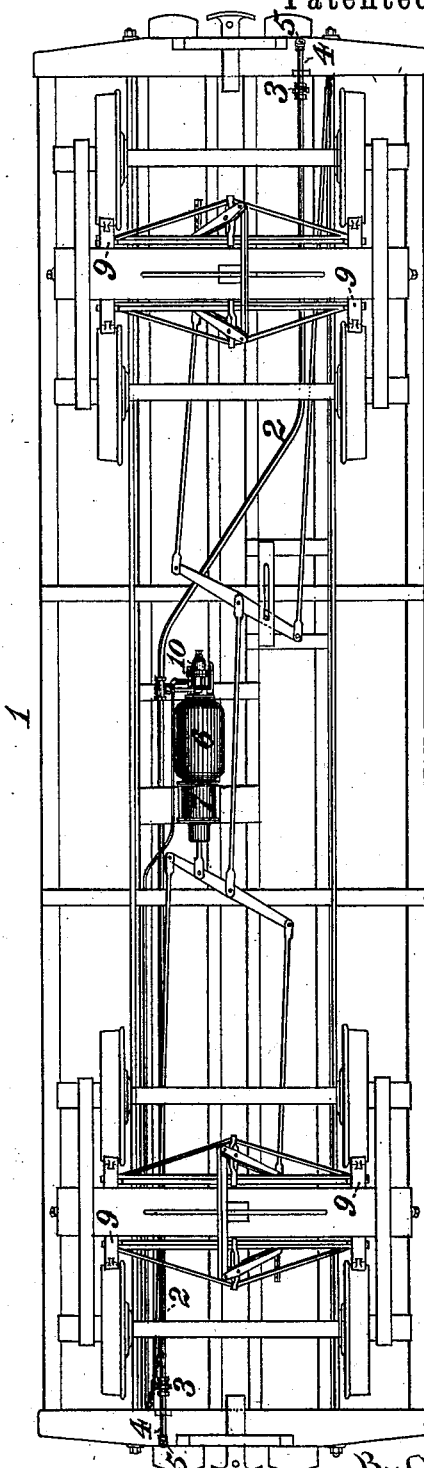

(Model.)

3 Sheets—Sheet 1.

G. WESTINGHOUSE, Jr.
FLUID PRESSURE AUTOMATIC BRAKE MECHANISM.

No. 360,070. Patented Mar. 29, 1887.

(Model.) 3 Sheets—Sheet 3.

G. WESTINGHOUSE, Jr.
FLUID PRESSURE AUTOMATIC BRAKE MECHANISM.

No. 360,070. Patented Mar. 29, 1887.

Witnesses
R. H. Whittlesey
C. M. Clarke

Inventor
George Westinghouse Jr.
By Attorney
J. Snowden Bell

UNITED STATES PATENT OFFICE.

GEORGE WESTINGHOUSE, JR., OF PITTSBURG, PENNSYLVANIA.

FLUID-PRESSURE AUTOMATIC-BRAKE MECHANISM.

SPECIFICATION forming part of Letters Patent No. 360,070, dated March 29, 1887.

Application filed November 19, 1886. Serial No. 219,353. (Model.)

*To all whom it may concern:*

Be it known that I, GEORGE WESTINGHOUSE, Jr., residing at Pittsburg, in the county of Allegheny and State of Pennsylvania, a citizen of the United States, have invented or discovered certain new and useful Improvements in Fluid-Pressure Automatic-Brake Mechanism, of which improvements the following is a specification.

The object of my invention is to enable the application of brake-shoes to car-wheels by fluid pressure to be effected with greater rapidity and effectiveness than heretofore, more particularly in trains of considerable length, as well as to economize compressed air in the operation of braking by utilizing in the brake-cylinders the greater portion of the volume of air which in former practice was directly discharged into the atmosphere.

To this end my invention, generally stated, consists in a novel combination of a brake-pipe, an auxiliary reservoir, a brake-cylinder, and a "triple-valve" device governing, primarily, communication between the auxiliary reservoir and the brake cylinder, and, secondarily, communication directly from the brake-pipe to the brake-cylinder.

The improvements claimed are hereinafter fully set forth.

In the application of the Westinghouse automatic brake as heretofore and at present commonly in use, each car is provided with a main air-pipe, an auxiliary reservoir, a brake-cylinder, and a triple valve, the triple valve having three connections—to wit, one to the main air-brake pipe, one to the auxiliary reservoir, and one to the brake-cylinder. The main air-pipe has a stop-cock at or near each of its ends, to be opened or closed as required, and is fitted with flexible connections and couplings for connecting the pipes from car to car of a train, so as to form a continuous line for the transmission of compressed air from a main reservoir supplied by an air-pump on the engine. When the brakes are off or released, but in readiness for action upon the wheels of the train, the air which fills the main reservoir and main air-pipes has a pressure of from sixty-five to seventy-five pounds to the square inch, and by reason of the connections referred to the same pressure is exerted in the casings of the triple valves on both sides of their pistons and in the auxiliary reservoirs connected therewith. At the same time passages called "release-ports" are open from the brake-cylinders to the atmosphere. When it is desired to apply the brakes, air is allowed to escape from the main air-pipes through the engineer's valve, thereby reducing the pressure in the main air-pipes, whereupon the then higher pressure in the auxiliary reservoirs moves the pistons of the triple valves, so as to first close the passages from the triple valves to the brake-pipe and at the same time close the release-ports of all the brake-cylinders, and then open the passages from the auxiliary reservoirs to the brake-cylinders, the pistons of which are forced out by the compressed air thereby admitted to the brake-cylinders, applying the brakes by means of suitable levers and connections, all of which mechanism is fully shown in various Letters Patent granted to me.

The application of the brakes with their full force has heretofore required a discharge of air from the main pipe sufficient to reduce the pressure in said pipe below that remaining in the auxiliary reservoir after the brakes have been fully applied, and it has been found that, while the brakes are sufficiently quick in action on comparatively short trains, their action on long trains of from thirty to fifty cars, which are common in freight service under present practice, is in a measure slow, particularly by reason of the fact that all the air required to be discharged from the main pipe to set the brakes must travel from the rear of the train to a single discharge-opening on the engine. This discharge of air at the engine has not only involved a serious loss of time in braking, but also a waste of air. Under my present invention a quicker and more efficient action of the brakes is obtained, and air which has been heretofore wasted in the application of the brakes is almost wholly utilized to act upon the brake-pistons.

Figure 2:
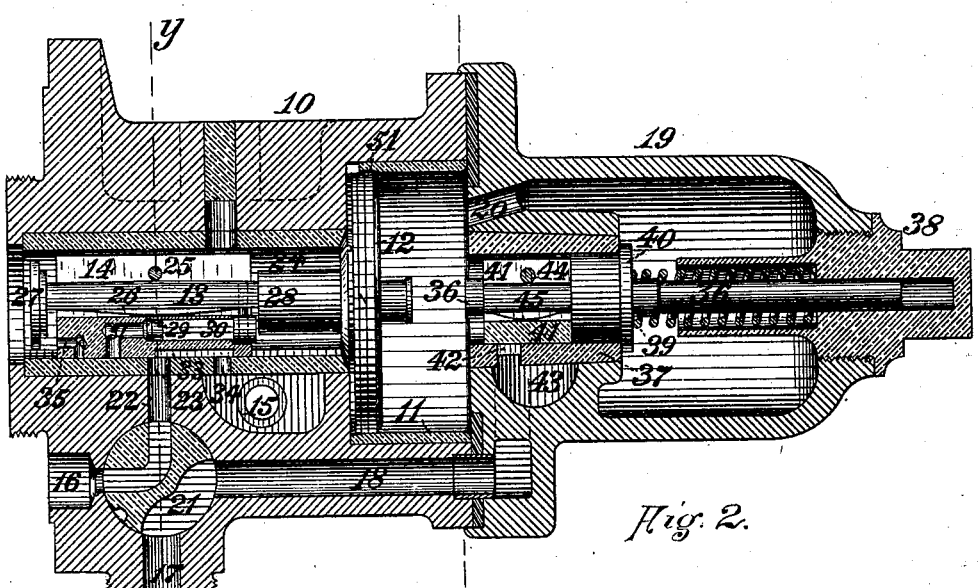
Figure 3:
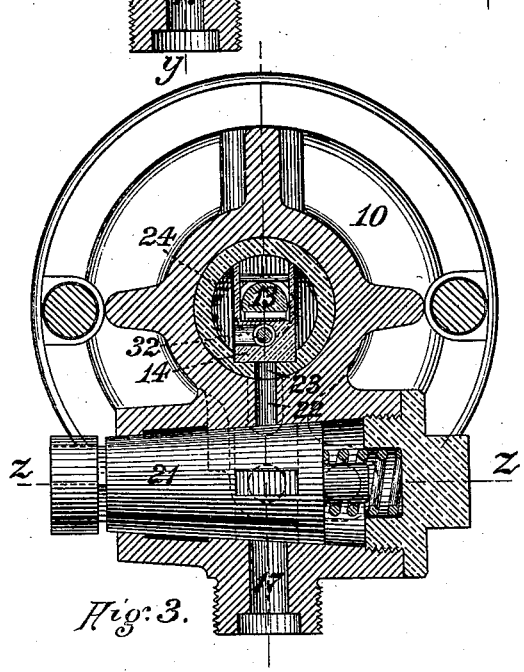
Figure 4:
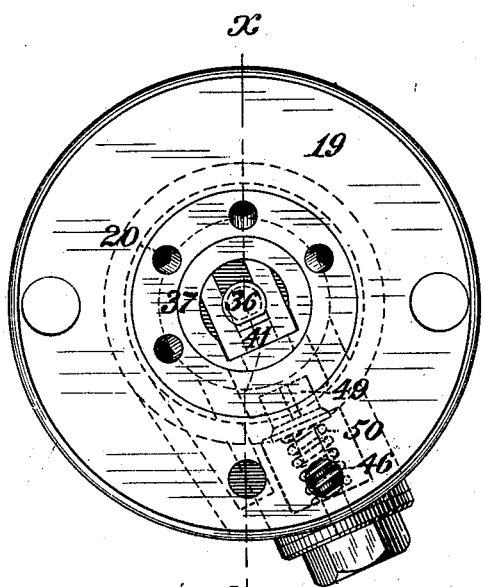
Figure 5:
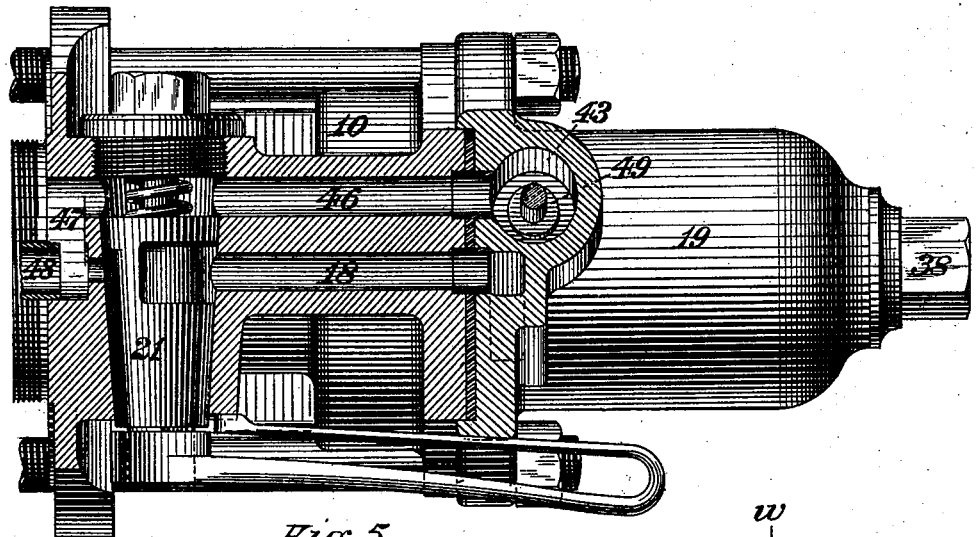
Figure 6:
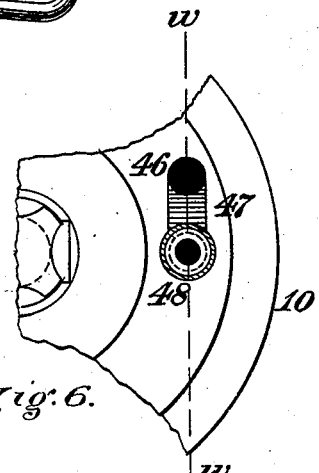
Figure 7:
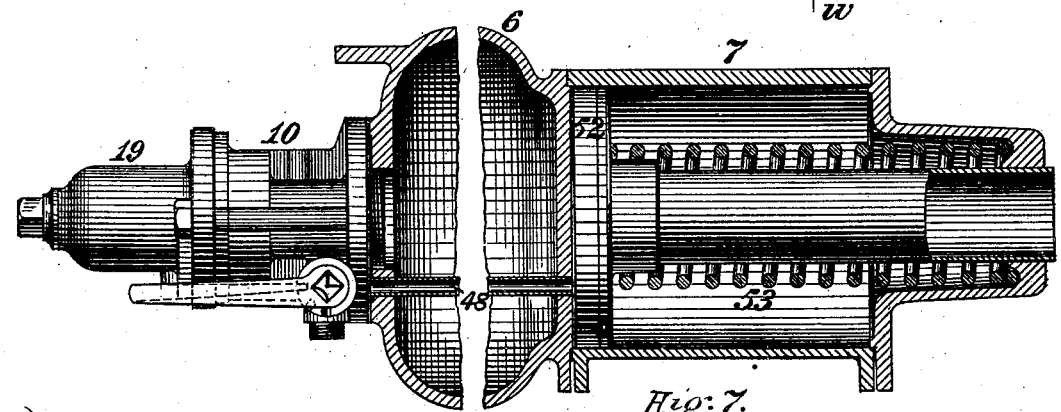

In the accompanying drawings, Figure 1 is an inverted plan view of a railroad-car, illustrating the application of my invention; Fig. 2, a longitudinal section, on an enlarged scale, through the triple valve at the line *x x* of Fig. 4; Fig. 3, a transverse section through the same at the line *y y* of Fig. 2; Fig. 4, a bottom plan view of the cap or drain-cup of the triple valve; Fig. 5, a longitudinal section through the triple valve at the lines z z of Fig. 3 and w w of Fig. 6; Fig. 6, a partial bottom plan view of the triple valve; and Fig. 7, a longitudinal central section through the brake-cylinder and auxiliary reservoir, with the triple valve in elevation.

In the practice of my invention each railroad car 1 on which it is applied is, as heretofore, provided with a main air-pipe, 2, governed by stop-cocks 3, adjacent to its ends, and having a flexible connection, 4, and coupling 5 at each end, to admit of being coupled to the main air-pipe of the tender or the adjacent car or cars of a train. An auxiliary reservoir, 6, and brake-cylinder 7 are secured in convenient position below the sills of the car, the brake-cylinder having a piston, 52, by the movement of which, through a system of lever-connections, which do not form part of my present invention, the brake-shoes 9 are applied to and released from the wheels of the car, compressed air being supplied to and released from the brake-cylinder 7 as the pressure in the main air-pipe is reduced or reinstated, respectively, by means of a triple valve, 10, the casing or chest of which communicates with the main air-pipe, the auxiliary reservoir, and the brake-cylinder.

So far as the performance of its preliminary function in ordinary braking is concerned—that is to say, effecting the closure of communication between the main air-pipe and the auxiliary reservoir, and the opening of communication between the auxiliary reservoir and the brake-cylinder in applying the brakes, and the reverse operations in releasing the brakes—the triple valve 10 accords substantially with that set forth in Letters Patent of the United States No. 220,556, granted and issued to me October 14, 1879, and is not, therefore, saving as to the structural features by which it performs the further function of effecting the direct admission of air from the main air-pipe to the brake-cylinder, as presently to be described, claimed as of my present invention. Certain of its elements devised and employed by me prior thereto will, however, be herein specified, in order to render its construction and operative relation to other members of the brake mechanism fully intelligible.

The case or chest in which the operative mechanism of the triple valve proper, 10, is mounted is fixed under or on the car-body in any convenient position relatively to the auxiliary reservoir 6 and brake-cylinder 7, being in this instance shown as secured directly to one end of the auxiliary reservoir, in line axially therewith and with the brake-cylinder, which is secured to its opposite end. The triple-valve case is fitted at one end with a cylindrical sleeve or bushing, 11, which is bored out truly and forms the chamber of a piston, 12, which is fixed upon a stem, 13, carrying, as in my Letters Patent No. 220,556, before mentioned, a slide-valve, 14, which controls communication between the auxiliary reservoir and the brake-cylinder, and between the brake-cylinder and release-port 15, respectively. The auxiliary reservoir 6 is continuously in communication with the chamber 11, on one side of the piston 12, through the longitudinal chamber 24 of the case in which the slide-valve 14 moves, and the triple-valve case communicates, by a passage, 16, with the brake-cylinder, and, by a passage, 17, with the main air-pipe 2. The passage 17, leading from the main air-pipe, communicates, by a passage, 18, with the cap or, as it is ordinarily termed, the "drain-cup" 19 of the triple valve, from which passages 20 lead into the piston-chamber 11. A four-way cock, 21, controls the passages 16, 17, 18, and a passage, 22, leading to a port, 23, in the face or seat of the slide-valve 14. When in the position shown in the drawings, communication is continuously maintained between the main air-pipe 2 and piston-chamber 11 through the passages 17 and 18, drain-cup 19, and passages 20, and by turning the cock 21, so as to establish communication between the passages 16 and 17, the triple valve and auxiliary reservoir will be cut out from the main air-pipe, and the mechanism can be operated as a non-automatic brake, the admission of air under pressure to the main air-pipe and brake-cylinder effecting, in such case, the application of the brakes.

The entire brake mechanism of the car other than the main air-pipe may be put out of action, when for any reason required, by turning the cock 21 into position to cover the passages 16 and 18, the main air-pipe then serving only for the transmission of air between the portions of the train-line made up by the main air-pipes of the remaining vehicles.

The slide-valve 14 is loosely connected with the stem 13 of the piston 12, and by a pin, 25, extending across the stem and fixed in the side plates of the valve, is prevented from being separated from the stem when removed for examination. It is held up to its seat in the chamber 24 by a spring, 26. The valve partakes in the reciprocating movements of the stem 13, being moved in one or the other direction by a collar, 27, and a shoulder, 28, respectively, on the stem. Said collar and shoulder are located at a distance apart slightly greater than the length of the valve 14, so that a limited degree of traverse of the stem 13 and piston 12 in each direction is effected without imparting movement to the valve. A graduating-valve, 29, secured upon a stem, 30, which is moved by the piston-stem 13, governs a passage, 31, in the slide-valve 14, said passage communicating by a lateral port, 32, with the valve-chamber 24, and consequently with the auxiliary reservoir. A cavity or passage, 33, is formed on the face of the slide-valve 14, of such length as to establish communication during a portion of the traverse of the valve between the port 23 of the valve-chamber 24, which is open to the passage 16, leading to the brake cylinder, and a port, 34, communicating with the relief-port 15.

The construction and relative arrangement of the piston-stem 13, slide-valve 14, and graduating-valve 29 are substantially similar to those of the corresponding parts as heretofore employed by me and exemplified in my Letters Patent No. 220,556; but under my present invention these are supplemented by a port, 35, leading from the end of the valve adjacent to the opening of the chamber 24, which communicates with the auxiliary reservoir, to the face of the valve, so as, at the limit of traverse of the piston-stem in the application of the brakes, to establish communication directly through said passage between the auxiliary reservoir and the port 23 and passages 22 and 16, leading to the brake-cylinder.

The piston-stem 13 abuts when the stem 13 and piston 12 are moved for the major portion of their traverse toward the drain-cup 19 against a stem, 36, which is fitted to slide freely in line axially with the stem 13 in an open-ended bushing, 37, in the end of the drain-cup 19 adjoining the piston-chamber 11, and in a guide formed in a screw-cap, 38, closing the opposite end of the drain-cup. A spring, 39, surrounding the stem 36 and bearing against the inside of the cap 38 and against a collar, 40, on the stem 36, maintains the latter in the position shown in Fig. 2, except when a sufficient pressure of air is admitted from the auxiliary reservoir to the piston-chamber to overcome the resistance of the spring and effect movement of the piston 12 beyond the point at which its stem 13 comes in contact with the stem 36.

So far as hereinbefore described, the triple valve accords in all substantial particulars with and is adapted to operate similarly to those of my Letters Patent Nos. 168,359, 172,064, and 220,556, and, in order that it may perform the further functions requisite in the practice of my present invention, it is provided with certain additional members, which will now be described. For the purpose of effecting the admission of air directly from the main air-pipe 2 to the brake-cylinder 7 when it is desired to apply the brakes with great rapidity and full force, an auxiliary slide-valve, 41, is connected to and moves with the stem 36, said valve working over a face in the bushing 37 between the piston-chamber 11 and drain-cup 19, and governing a port, 42, in said face leading into a chamber, 43, adjoining the same. The valve 41 has lateral wings or plates fitting on each side of the stem 36, between shoulders or collars thereon, and is held thereto, when the stem is removed, between collars or shoulders thereon abutting against its ends, by a pin, 44, in its wings, a spring, 45, acting to hold it to its seat in the bushing 37 when in position. The chamber 43 communicates by a passage, 46, Fig. 5, with a chamber, 47, in the end of the case of the triple valve adjacent to the auxiliary reservoir, from which chamber a passage, 48, leads through the auxiliary reservoir into the brake-cylinder 7. The chamber 43 is further provided with a check-valve, 49, which opens outwardly into and controls the passage of air into the passage 46, said valve being held to its seat by a light spring, 50, and serving to prevent the return of air from the brake-cylinder when the pressure in the main air-pipe is reduced below that in the brake-cylinder, as in the case of the separation of the cars of the train by the breaking of a coupling.

In the operation of the brake mechanism as above described, air from the main reservoir and main air-pipe passes through the passages 17 18, drain-cup 19, and passages 20 into the piston-chamber 11, forcing the piston 12 to the left-hand extremity of its stroke and uncovering a small feeding-groove, 51, in the piston-chamber, through which air passes into the auxiliary reservoir 6 until the pressure in the latter is equal to that in the main air-pipe, the brake-cylinder being meanwhile in communication with the atmosphere through the passages 16 and 22, valve-cavity 33, and ports 23 34, and release-port 15. To apply the brakes in making ordinary stops, a portion of the air is discharged from the main air-pipe by the engineer's valve, thereby correspondingly reducing the pressure in the main air-pipe, whereupon the higher pressure in the auxiliary reservoir moves the piston 12 to the right, covering the feeding-groove 51, and thus preventing the return of air from the auxiliary reservoir to the main air-pipe, the movement of the piston continuing until arrested by the decrease of pressure in the auxiliary reservoir or by the stem 36 and its spring 39. The movement of the slide-valve 14 then closes the port 23, preventing escape of air from the brake-cylinder, and places the passage 31 partly or wholly in communication with the port 33. The small auxiliary valve 29 having been meanwhile unseated by the movement of the piston-stem, compressed air from the auxiliary reservoir passes through the lateral port 32 and passage 31 of the slide-valve 14 and the passages 22 and 16 of the triple-valve case to the brake-cylinder, forcing out the piston, and, through an appropriate system of levers and connections, applying the brakes. When the pressure in the auxiliary reservoir has in this operation been reduced by expansion into the brake-cylinder until it is slightly below the pressure in the main air-pipe, the pressure on the air-pipe side of the piston 12 forces the piston 12 in the opposite direction until the auxiliary valve 29 closes the passage 31, thereby arresting the further flow of air from the reservoir to the brake-cylinder and holding the brakes with a force proportionate to the reduction of pressure in the brake-pipe. To release the brakes, the pressure in the main air-pipe is increased by admitting air from the main reservoir, whereupon the resultant increase of pressure in the piston-chamber 11 forces the piston 12 back to its original or normal position, permitting the escape of air from the brake-cylinder 7, the piston 52 of which is returned to its position by a spring, 53, releasing in its backward movement the brake-shoes 9 from the wheels, and at the same time the auxiliary reservoir is recharged. The admission of air to the brake-cylinder through the passage 31, which is opened just before the piston stem comes in contact with the graduating-stem, and which corresponds to the feed-passage heretofore employed, suffices for the ordinary requirements of braking in regular service. In the event, however, of its becoming necessary to apply the brakes with great rapidity and with their greatest available force, the engineer, by means of the valve at his command, instantly discharges sufficient air from the front end of the main air-pipe to effect a sudden reduction of pressure of about twenty pounds per square inch therein, whereupon the piston 12 of the triple valve is forced to the extreme limit of its stroke in the direction of the drain-cup 19, carrying with it the stem 36 and auxiliary slide valve 41, which instantly uncovers the port 42 and discharges air from the main air-pipe through the opening of the check-valve 49 and the passages 46 and 48 to the brake-cylinder, and, each car being provided with one of these devices, it will be seen that they are successively moved with great rapidity, there being practically on a train of fifty cars fifty openings for discharging compressed air from the main pipe, instead of the single opening heretofore commonly used. Not only is there a passage of considerable size opened from the brake-pipe on each car, whereby the pressure is more quickly reduced, but the air so discharged is utilized in the performance of preliminary work, it being found in practice that the air so taken from the pipe will exert a pressure of about twenty-five pounds in the brake-cylinders. When the piston 12 arrives at the extremity of its stroke, as above specified, the supplemental port 35 of the slide-valve 14 is brought into communication with the port 33 and passages 22 and 16, which serves to discharge the reservoir-pressure into the brake-cylinder, thereby augmenting the pressure already exerted in the brake-cylinder by the air admitted from the main air-pipe. Upon the reduction of the pressure in the main air-pipe below that in the brake-cylinders, as by the breaking in two of the train, the check-valve 49 closes communication between the passages 46 and 18, thereby preventing the return of the air from the brake-cylinder to the main air-pipe. The feed-opening for the admission of air from the auxiliary reservoir to the brake-cylinder is purposely made of comparatively small diameter, it having been determined by experiment that the initial application of the brakes should not be made with maximum force, and this opening may be made of such size as to apply the brakes exactly in accord with the requirements of the most efficient work.

In using the terms "triple valve" and "triple-valve device" I refer to a valve device, however specifically constructed, having a connection with the main air or brake pipe, another with an auxiliary reservoir or chamber for the storage of power, and another with a brake-cylinder or its equivalent for the utilization of the stored power and with a release or discharge passage for releasing the operative power from the brake-cylinder, whether the valves governing these passages or connections are arranged in one or more cases and are moved by a piston or its equivalent or by a series of pistons or their equivalents, there being numerous examples in the art of constructions varying materially in appearance whereby these functions are performed, both in plenum and vacuum brake mechanisms.

While I have herein described my invention as applied in a brake mechanism utilizing air under pressure, such as is in general and approved use, I do not desire to limit myself to brakes so operated, as my improvements are likewise susceptible of application, without variation of principle, in connection with brakes worked by atmospheric pressure.

I am aware that a construction in which "an always-open one-way passage" from the main air-pipe to the brake-cylinder is uncovered by the piston of the triple valve simultaneously with the opening of the passage from the auxiliary reservoir to the brake-cylinder has been heretofore proposed, and such construction, which involves an operation different from that of my invention, I therefore hereby disclaim.

I claim as my invention and desire to secure by Letters Patent—

1. In a brake mechanism, the combination of a main air-pipe, an auxiliary reservoir, a brake-cylinder, a triple valve, and an auxiliary-valve device, actuated by the piston of the triple valve and independent of the main valve thereof, for admitting air in the application of the brake directly from the main air-pipe to the brake-cylinder, substantially as set forth.

2. In a brake mechanism, the combination of a main air-pipe, an auxiliary reservoir, a brake-cylinder, and a triple valve having a piston whose preliminary traverse admits air from the auxiliary reservoir to the brake-cylinder, and which by a further traverse admits air directly from the main air-pipe to the brake-cylinder, substantially as set forth.

3. In a brake mechanism, the combination of a main air-pipe, an auxiliary reservoir, a brake-cylinder, and a triple valve having a piston whose preliminary traverse admits air from the auxiliary reservoir to the brake-cylinder, and which by a further traverse admits air directly from the main air-pipe to the brake-cylinder and effects a second admission of air from the auxiliary reservoir to the brake-cylinder, substantially as set forth.

4. The combination, in a triple-valve device, of a case or chest, a piston fixed upon a stem and working in a chamber therein, a valve moving with the piston-stem and governing ports and passages in the case leading to connections with an auxiliary reservoir and a brake-cylinder and to the atmosphere, respectively, and an auxiliary valve actuated by the piston-stem and controlling communication between passages leading to connections with a main air-pipe and with the brake-cylinder, respectively, substantially as set forth.

5. The combination, in a triple-valve device, of a case or chest, a piston fixed upon a stem and working in a chamber therein, a valve moving with the piston-stem and governing ports and passages in the case leading to connections with an auxiliary reservoir and a brake-cylinder and to the atmosphere, respectively, an auxiliary valve actuated by the piston-stem and controlling communication between passages leading to connections with a main air-pipe and with the brake-cylinder, respectively, and a check or non-return valve interposed between the auxiliary valve and the passage leading therefrom to the brake-cylinder, substantially as set forth.

6. The combination, in a triple-valve device, of a case or chest, a piston fixed upon a stem and working in a chamber therein, a valve moving with the piston-stem and governing ports and passages in the case leading to connections with an auxiliary reservoir and a brake-cylinder and to the atmosphere, respectively, an auxiliary stem mounted in the cap of the case in position to be moved longitudinally by the piston-stem in the latter portion of its traverse in the direction required for the application of the brakes, a spring bearing against a collar on the auxiliary stem and against a fixed abutment, and an auxiliary valve connected to the auxiliary stem and controlling communication between passages leading to connections with a main air-pipe and with the brake-cylinder, respectively, substantially as set forth.

7. The combination, in a triple-valve device, of a case or chest, a piston fixed upon a stem and working in a chamber therein, an auxiliary valve actuated by the piston-stem and controlling communication between passages leading to connections with a main air-pipe and with a brake-cylinder, respectively, and a main valve connected to the piston-stem and governing ports and passages in the case leading to connections with an auxiliary reservoir and a brake-cylinder and to the atmosphere, respectively, said main valve having a supplemental port or passage which establishes communication between the auxiliary reservoir and brake-cylinder connections at or near the limit of the traverse of the main valve in effecting the application of the brake under maximum pressure, substantially as set forth.

In testimony whereof I have hereunto set my hand.

GEO. WESTINGHOUSE, JR.

Witnesses:
J. SNOWDEN BELL,
R. H. WHITTLESEY.